United States Patent
Zhang et al.

(10) Patent No.: US 10,459,750 B2
(45) Date of Patent: Oct. 29, 2019

(54) TENANT-CONTROLLED CLOUD APPARATUS

(71) Applicant: MICROSOFT TECHNOLOGY LICENSING, LLC, Redmond, WA (US)

(72) Inventors: Jiaxing Zhang, Beijing (CN); Thomas Moscibroda, Beijing (CN); Haoran Wang, Shanghai (CN); Jurgen Aubrey Willis, Woodinville, WA (US); Yang Chen, Beijing (CN); Ying Yan, Beijing (CN); James E. Johnson, Jr., Bellevue, WA (US); Ajay Mani, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 119 days.

(21) Appl. No.: 15/578,967

(22) PCT Filed: Jun. 10, 2016

(86) PCT No.: PCT/US2016/037041
§ 371 (c)(1),
(2) Date: Dec. 1, 2017

(87) PCT Pub. No.: WO2016/201340
PCT Pub. Date: Dec. 15, 2016

(65) Prior Publication Data
US 2018/0136960 A1     May 17, 2018

(30) Foreign Application Priority Data
Jun. 12, 2015   (CN) .......................... 2015 1 0325802

(51) Int. Cl.
*G06F 9/455* (2018.01)
*G06F 8/65* (2018.01)
(Continued)

(52) U.S. Cl.
CPC ............ *G06F 9/45558* (2013.01); *G06F 8/65* (2013.01); *G06F 8/656* (2018.02); *G06F 9/4856* (2013.01);
(Continued)

(58) Field of Classification Search
CPC ................................................... G06F 9/45533
(Continued)

(56) References Cited

U.S. PATENT DOCUMENTS 8,407,689 B2 * 3/2013 Dournov ............. G06F 9/45533
717/172
8,615,579 B1 * 12/2013 Vincent ................. G06F 9/4856
709/224
(Continued)

FOREIGN PATENT DOCUMENTS

| CN | 102571906 A | 7/2012 |
| CN | 102750312 A | 10/2012 |
| CN | 103414787 A | 11/2013 |

OTHER PUBLICATIONS

"Virtual Private Cloud-as-a-Service: Extend Enterprise Security Policies to Public Clouds", In White Paper, Retrieved on: Apr. 6, 2015, 9 pages.
(Continued)

*Primary Examiner* — Mehran Kamran
(74) *Attorney, Agent, or Firm* — Merchant & Gould

(57) ABSTRACT

Systems and methods are taught for providing customers of a cloud computing service to control when updates affect the services provided to the customers. Because multiple customers share the cloud's infrastructure, each customer may
(Continued)

have conflicting preferences for when an update and associated downtime occurs. Preventing and resolving conflicts between the preferences of multiple customers while providing them with input for scheduling a planned update may reduce the inconvenience posed by updates. Additionally, the schedule for the update may be transmitted to customers so that they can prepare for the downtime of services associated with the update.

15 Claims, 7 Drawing Sheets

(51) Int. Cl.
  *G06F 9/48*    (2006.01)
  *G06F 9/50*    (2006.01)
  *G06F 8/656*   (2018.01)

(52) U.S. Cl.
  CPC .......... *G06F 9/4881* (2013.01); *G06F 9/5072* (2013.01); *G06F 9/5088* (2013.01); *G06F 2009/4557* (2013.01)

(58) Field of Classification Search
  USPC .......................................................... 718/1
  See application file for complete search history.

(56) References Cited

U.S. PATENT DOCUMENTS

| | | | | |
|---|---|---|---|---|
| 8,799,888 | B1* | 8/2014 | Fitzgerald ................ | G06F 8/65 717/168 |
| 2009/0100419 | A1* | 4/2009 | Childress ................. | G06F 8/65 717/171 |
| 2010/0235825 | A1* | 9/2010 | Azulay .................... | G06F 8/65 717/172 |
| 2011/0131309 | A1 | 6/2011 | Akiyama et al. | |
| 2011/0214021 | A1* | 9/2011 | Vidal ....................... | G06F 8/65 714/38.1 |
| 2011/0321031 | A1* | 12/2011 | Dournov .................. | G06F 8/65 717/171 |
| 2012/0102480 | A1* | 4/2012 | Hopmann ............... | G06F 8/656 717/172 |
| 2012/0266167 | A1* | 10/2012 | Spiers ................... | H04L 63/0218 718/1 |
| 2013/0036449 | A1* | 2/2013 | Mukkara ................. | G06F 21/53 726/1 |
| 2013/0263104 | A1* | 10/2013 | Baset ....................... | G06F 8/68 717/168 |
| 2014/0006580 | A1* | 1/2014 | Raghu .................... | G06F 9/5072 709/223 |
| 2014/0156847 | A1* | 6/2014 | Moscibroda .......... | H04L 67/1095 709/226 |
| 2014/0380314 | A1* | 12/2014 | Shimada ............... | G06F 9/4856 718/1 |
| 2015/0012624 | A1* | 1/2015 | Geiger .................. | H04L 41/082 709/221 |
| 2015/0039556 | A1* | 2/2015 | Mackenzie ......... | G06F 16/1767 707/608 |
| 2015/0040127 | A1 | 2/2015 | Dippenaar et al. | |
| 2015/0089066 | A1* | 3/2015 | Meswani .............. | H04L 47/741 709/226 |

OTHER PUBLICATIONS

"Ensim Releases Multiple Updates for Latest Microsoft Cloud and Hosting Technologies", Published on: Mar. 17, 2005, Available at: http://www.ensim.com/news/releases/2015/Ensim-Releases-Multiple-Updates-Latest-Microsoft-Cloud-Hosting-Technologies.
Tang, Bo, "Multi-Tenant Access Control for Cloud Services", In Doctoral Dissertation, Aug. 2014, 110 pages.
Tang, et al., "A Multi-Tenant RBAC Model for Collaborative Cloud Services", In Proceedings of Eleventh Annual International Conference on Privacy, Security and Trust, Jul. 10, 2013, 10 pages.
Dunn, Michael D., "Running Mission Critical Solutions on Windows Azure", Published on: May 17, 2012, Available at: http://blogs.msdn.com/b/midunn/archive/2012/05/17/running-mission-critical-solutions-on-windows-azure.aspx.
Rouse, Margaret, "Multi-tenancy", Published on: May 24, 2012, Available at: http://whatis.techtarget.com/definition/multi-tenancy.
Molnar, et al., "Self Hosting vs. Cloud Hosting: Accounting for the Security Impact of Hosting in the Cloud", In Proceedings of the Ninth Workshop on the Economics of Information Security, Jun. 7, 2010, 18 pages.
Sperling, Nannette, "Hosting Service Provider Technical Deployment Training—Channel 9", Retrieved on: Apr. 6, 2015, Available at: https://channel9.msdn.com/series/Technical-Deployment-Training-R2-Cloud-Infra-Windows-Server-2012-R2System-Center-2012-R2-SQL-2012-an/RSS.
Wood, Mike, "The Operating Systems of Windows Azure", A Technical Journal and Community Hub from Redgate, Aug. 7, 2013, 5 pages.
Koponen, et al., "Network Virtualization in Multi-tenant Datacenters", In Technical Report—TR-2013-001E, Retrieved on: Apr. 6, 2015, 22 pages.
International Search Report and Written Opinion for PCT/US2016/037041, dated Oct. 17, 2016.
"First Office Action and Search Report Issued in Chinese Patent Application No. 201510325802.4", dated Dec. 24, 2018, 15 Pages.
"Second Written Opinion Issued in PCT Application No. PCT/US2016/037041", dated Apr. 18, 2017, 7 Pages.
"International Preliminary Report on Patentability Issued in PCT Application No. PCT/US2016/037041", dated Sep. 18, 2017, 8 Pages.
"Office Action Issued in European Patent Application No. 16733250.1", dated Feb. 15, 2019, 7 Pages.

\* cited by examiner

TENANT-CONTROLLED CLOUD APPARATUS

CROSS REFERENCE TO RELATED APPLICATIONS

This application is a U.S. National Stage Application of PCT/US2016/037041, filed 10 Jun. 2016, which claims priority to Chinese Patent Application No. 201510325802.4, filed 12 Jun. 2015, which applications are incorporated herein by reference. To the extent appropriate, a claim of priority is made to each of the above disclosed applications.

BACKGROUND

Cloud computing has improved the flexibility and lowered the cost of information technology services for many entities, Host Machines provided by a Cloud Service Provider (CSP) enable entities to make use of shared infrastructure as tenants of the Host Machines to run instances of Virtual Machines (VM) or other cloud-based containers for services applications or processes, on an as-needed basis.

Shared infrastructure in the cloud allows millions of VMs to be hosted in data centers on Host Machines. In order to introduce new functionality, improve performance, fix security holes, patch bugs, or perform physical maintenance on host machines, however, it is frequently required that VM instances or the underlying Operating System of the host machine (HostOS) be taken offline and made unavailable, such as, for example, during a reboot of the host machine. This unavailability may result in a cached VM state being lost, tenants being prevented from accessing services when they are needed, service instances being unavailable to clients, etc., and constitutes a significant inconvenience.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Cloud Service Providers (CSP) provide access to a shared infrastructure of host machines to their customers. Sharing infrastructure enables customers to reduce capital costs (e.g., the cost of purchasing or maintaining physical computing hardware), gain access to the operating expertise of the CSP, and quickly expand or reduce Information Technology capabilities as the need arises. Customers access the shared infrastructure as tenants of host machines, and multiple customers may be tenants of one host machine. Host machines run Virtual Machines (VM) and other cloud-based containers for services applications or processes for their tenants, which provide systems and processes (e.g., software) to tenants without requiring the tenant to own, control or maintain the corresponding hardware. As will be understood, a host machine may concurrently run several VMs for several tenants.

Downtime for a host machine constitutes a significant inconvenience for customers, but may be necessary to allow CSPs to introduce new functionalities, improve performance, fix security holes, patch bugs, etc. To reduce the inconvenience posed to customers by downtime, several systems and methods are provided herein to enable tenant-controlled cloud updates.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

The accompanying drawings, which are incorporated in and constitute a part of this disclosure, illustrate various aspects and examples of systems and methods for providing tenant-controlled cloud updates. In the drawings.

DETAILED DESCRIPTION

Figure 1A:
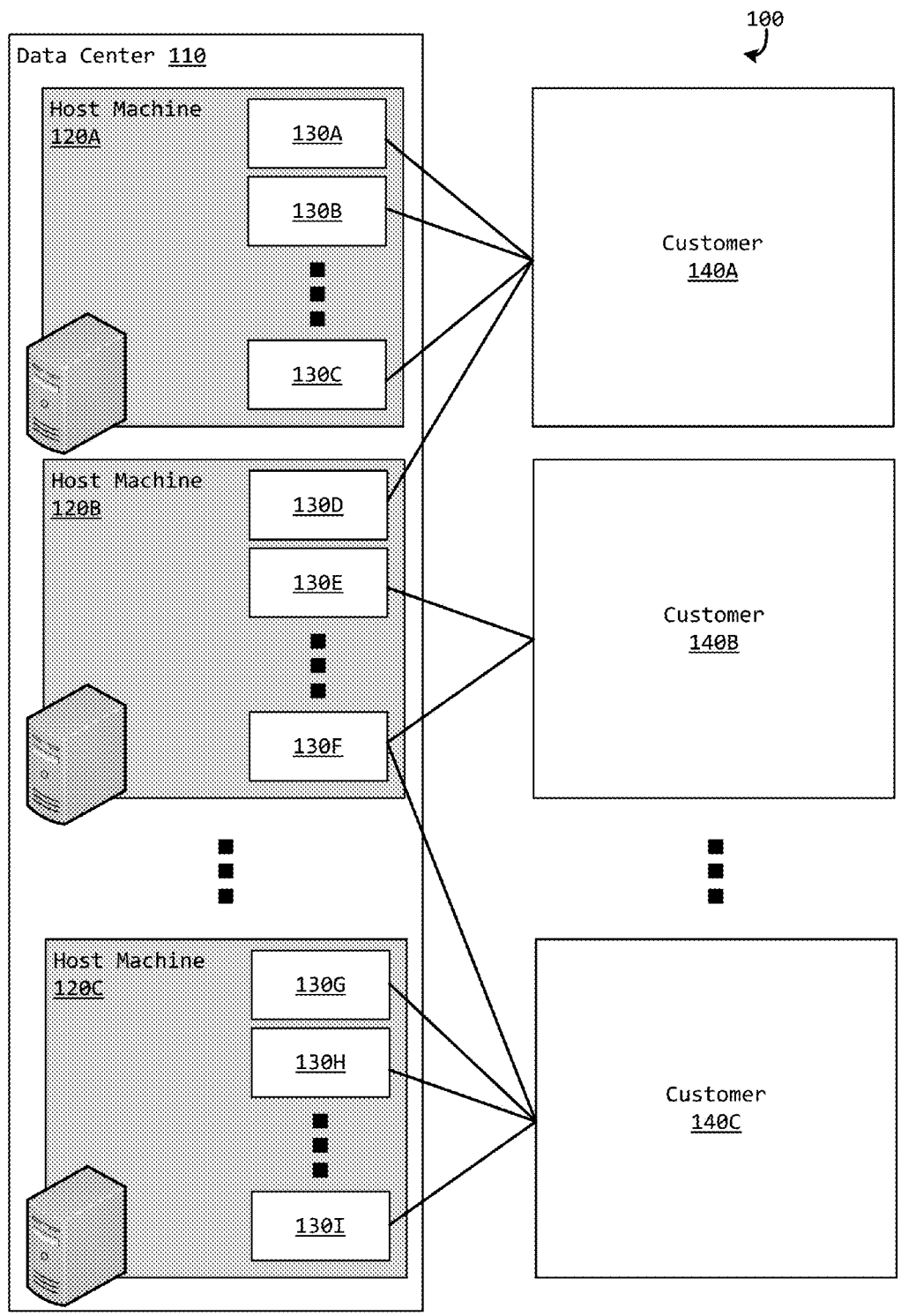
FIG. 1A illustrates an example cloud computing environment.

The following detailed description refers to the accompanying drawings. Wherever possible, the same reference numbers are used in the drawings and the following description to refer to the same or similar elements. While aspects may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the present disclosure, but instead, the proper scope is defined by the appended claims. Examples may take the form of a hardware implementation, or an entirely software implementation, or an implementation combining software and hardware aspects. The following detailed description is, therefore, not to be taken in a limiting sense.

Cloud based services provide users the ability to access remotely hosted services of various types. The cloud is a shared infrastructure that users access as tenants of host machines provided by Cloud Service Providers (CSPs). Sharing infrastructure enables users to reduce capital costs (e.g., the cost of purchasing or maintaining physical computing hardware), gain access to the operating expertise of the CSP, and quickly expand or reduce Information Technology capabilities as the need arises. The CSPs control the hardware, and depending on the services provided, various levels of software (e.g., platform, operating system, applications, etc.) provided for the users' access. As the hardware and software are updated and maintained, the CSPs may need to take portions of the shared infrastructure offline temporarily. This downtime is often a significant inconvenience for users, even though CSPs will attempt to complete updates or maintenance as quickly as possible and only take a portion of the machines providing services offline at any given time. The present disclosure describes additional systems and methods for reducing the inconvenience of downtime for cloud users by providing tenant control for cloud updates.

FIG. 1A illustrates an example cloud computing environment 100. A data center 110 is illustrated as providing a first host machine 120A, a second host machine 120B, and an nth host machine 120C (collectively, host machines 120). Each host machine 120 is illustrated as providing a several instances of virtual machines (VMs) 130A-1 (collectively, VM 130). For purposes of clarity and brevity in the present disclosure, the term "VM" is to be understood to encompass all cloud-based containers for services, applications, or processes. As illustrated, these VMs 130 are accessed by a first customer 140A, a second customer 140B, and an nth customer 140C (collectively, customers 140), who are tenants of the illustrated host machines 120. As will be understood, more or fewer host machines 120, VMs 130, and customers 140 than those illustrated in FIG. 1A may be present in various examples of cloud computing, and FIG. 1A is given as an example.

Data centers 110 are operated by CSPs to provide customers 140 with access to a shared infrastructure of host machines 120. CSPs may provide customers 140 with access according to several service models, including, but not limited to: Software as a Service (SaaS), where the CSP provides both software and hardware for the customer 140 to use; Platform as a Service (PaaS), where the CSP provides hardware and Operating Systems (OS) for the customer 140 to run its application software on; or Infrastructure as a Service (IaaS), where the CSP provides hardware for the customer 140 to run its OS and application software on. In various aspects, hardware provided to customers 140 by a CSP includes, but is not limited to: host machines 120, servers, storage networks, switches, routers, cabling, etc.

A customer 140 may access the services provided by the CSP via various client devices through program interfaces or thin client interfaces (e.g., web browsers) These interfaces may connect the client device and associated application to a data center 110 providing the services via several suitable means, including both public networks (e.g., the Internet) and private networks, over several suitable transmission media, such as, for example: optical cables, electrical cables, radio signals, etc.

The services provided to a customer 140 are hosted on a host machine 120. A host machine 120 may offer several partitions on which to run VMs 130. As will be understood, a customer 140 may, as part of a service level agreement (SLA) with a CSP, specify the computing resources offered by a single VM 130, a number of VMs 130 requested, and a requested up-time or availability for the services. As will be understood, the SLA affects the number of VMs 130 a host machine 120 may provide to a given customer 140, the number of VMs 130 a given host machine 120 may provide to customers 140, and how host machines 120 are provisioned to customers 140.

In some examples, a host machine 120 may provide all hosted instances of VMs 130 to a single customer 140 as a tenant, such as is illustrated regarding the first host machine 120A and the first customer 140A. In various other examples, a given host machine 120 may provide hosted instances of VMs 130 to multiple customers 140 as tenants, such as is illustrated regarding the second host machine 120B and the first customer 140A, second customer 140B, and nth customer 140C.

Similarly, a given customer 140 may be a tenant of multiple host machines 120, as is illustrated for first customer 140A. By spreading the tenancy of a customer 140 across multiple host machines 120, greater update and fault tolerances can be provided to the customer 140.

Additionally, in some examples, customers 140 may share access to an instance of a VM 130, such as is illustrated regarding second customer 140B and nth customer 140C sharing access to VM 130F hosted by second host machine 120B. When customers 140 share access to a VM 130, the VM 130 may be referred to as having shared tenancy and the customers 140 may be referred to as shared tenants.

The host machines 120 in a data center 110 are computing devices. Each host machine 120 may include an operating system (a HostOS) for running background tasks, providing individual kernels of the host machine 120 as partitions to provide VMs 130, etc. The HostOs or the programs underlying each VM 130 may need to be updated periodically, such as, for example, to introduce new functionality, improve performance, fix security holes, patch bugs, etc. In various examples, these updates require the host machine 120 to be shut down and restarted for the update to be applied, which causes downtime for the host machine 120 (and any hosted VMs 130) as the update is applied. Similarly, maintenance (planned or emergency) to the physical components of host machines 120 may require the host machine 120 to be shut down and cause downtime for the host machine 120 as maintenance is performed. In other examples, the host machine 120 may be left running, and a reset of the HostOS or any shared application, process, container, or service (e.g., a hypervisor, a shared VM 130, etc.) may cause downtime for multiple customers 140.

Depending on the SLA and the services provided, customers 140 may have limited control to update their personal applications or OS software running on a host machine 120 so long as it does not affect the other tenants, but in a multi-tenant environment, control over when updates that may affect multiple tenants were to be made has been left to the CSP, The CSP is responsible for ensuring the availability of services for several customers 140 according to their SLAB, and, traditionally, for determining whether and when to update the HostOS for the host machines 120 or perform other updates or maintenance that could take services temporarily offline.

Figure 1B:
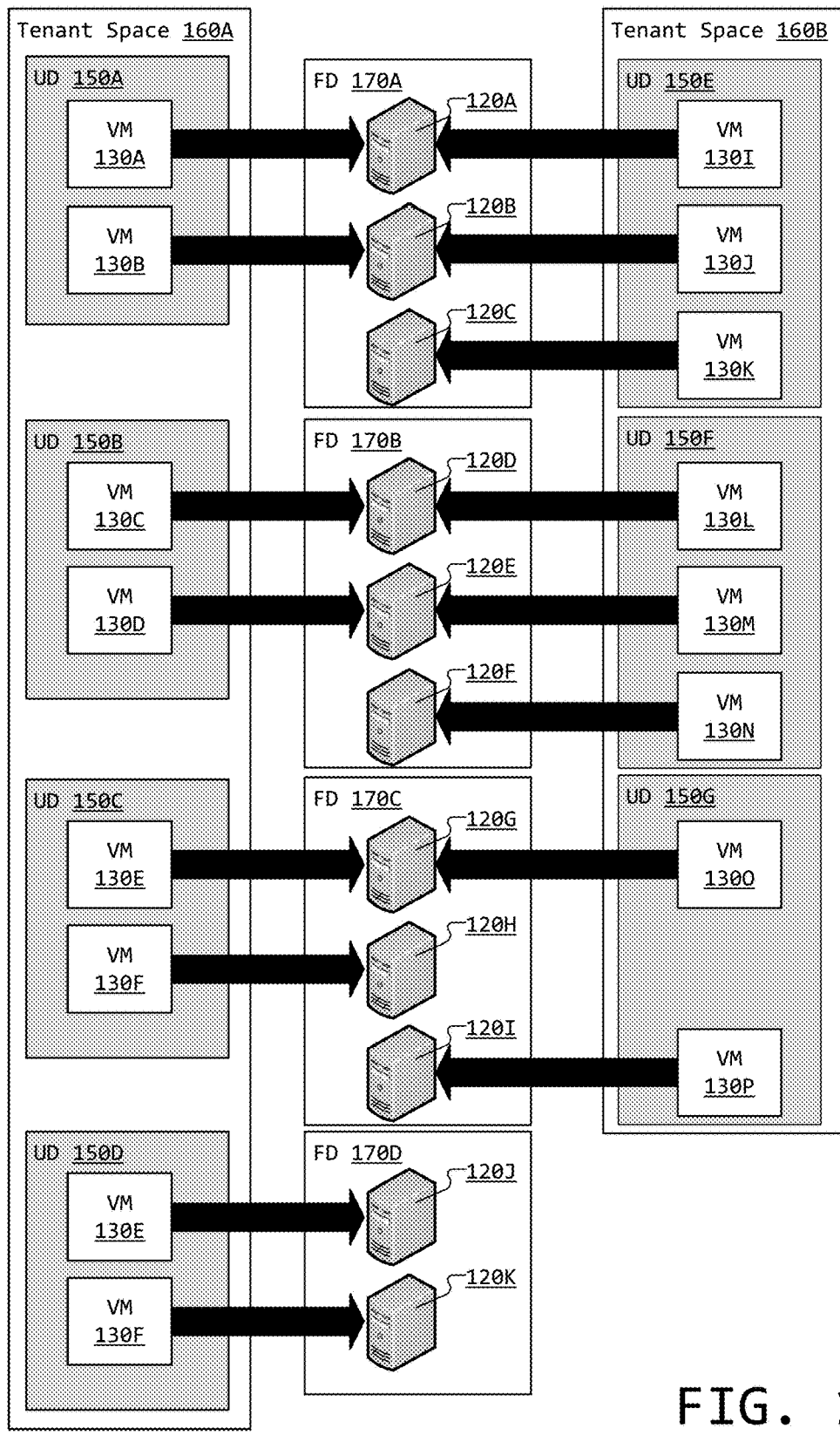
FIG. 1B illustrates an example assignment of host machines forming upgrade domains to host virtual machines.

FIG. 1B illustrates an example assignment 101 of VMs 130 to host machines 120. In a data center 110, instances of VMs 130 are assigned to host machines 120, and the collection of VMs 130 for a given customer 140 may be referred to as the tenant space 160 for that customer 140. A tenant space 160 may be further divided into update domains (LTD) 150, which are sets of VMs 130 that may face a downtime at the same time due to a planned service outage (e.g., to perform maintenance, apply an update, etc.).

In FIG. 1B, two tenant spaces 160 are illustrated for two customers 140; a first tenant space 160A and a second tenant space 160B each with eight VMs 130. As will be understood, more or fewer tenant spaces 160 than those illustrated in the example assignment 101 may be provided in a data center 110 and the tenant spaces 160 may include more or fewer VMs 130 grouped into more or fewer UDs 150 assigned to more or fewer host machines 120 than those illustrated in the example assignment 101. As illustrated, each tenant space 160 includes eight VMs 130; VM 130A-H in tenant space 160A and VM 130I-P in tenant space 160B. Each tenant space 160 includes the VMs 130 that the given customer 140 is provided per their SLA. Each of these VMs 130 are assigned to a host machine 120, and in various examples, multiple VMs 130 from different tenant spaces 160 may be assigned to a single host machine 120. For example, in the FIG. 1B, host machine 120A hosts VM 130A from tenant space 160A and VM 130I from tenant space 160B.

In the illustrated example, the first tenant space 160A has been further divided into four UDs 150A-D, each with no more than two VMs 130 assigned to a given UD 150, whereas the second tenant space 160B has been further divided into three UDs 150E-G, each with no more than three VMs 130 assigned to a given UD 150. The UDs 150 may be used to regulate how an update affects a tenant space 160 such that a given host machine 120 may only be taken offline if the VMs 130 that it hosts do not share a UD 150 with other VMs 130 that are hosted by other host machines 120 that are offline, Stated differently, an update constraint from the SLA (in some aspects represented by a UD 150) may restrict the number of VMs 130 from the same tenant space 160 that may be unavailable at the same time due to their host machines 120 being offline. In various aspects, the update constraint may also require that a minimum number of VMs 130 from the tenant space 160 have their associated host machines 120 updated at the same time, and may, in some examples, specify which VMs 130 to select.

In various aspects, the UDs 150 may be assigned to specific VMs 130 for multiple update and maintenance events according to update constraints, so that the specified VMs 130 update together. In other aspects, the groups of VMs 130 from a single tenant space 160 that update together may vary between subsequent update and maintenance events, and are formed with respect to update constraints and the time at which their host machines 120 are available to update. For example, example UD 150A may be assigned to the specific instances of VM 130A and VM 130B for each update or maintenance event, or the assignment may be fluid in that VM 130A and 130B were simply the first two VMs 130 that had host machines 120 available to update.

Tenant spaces 160 may be divided evenly or unevenly across UDs 150. For example, tenant space 160A is spread evenly across four UDs 150A-D with each UD 150 being assigned two VMs 130, whereas tenant space 160B is spread unevenly across three UDs 150E-G, with UDs 150A and 150B being assigned three VMs 130 and UD 150C being assigned two VMs 130. VMs 130 may be assigned unevenly when the number of VMs 130 do not permit for even division across a given number of UDs 150, customer requests for uneven distribution, etc. In various aspects, customers 140 may specify or adjust the number of UDs 150 they use, but as will be understood, a customer 140 may not have more UDs 150 than VMs 130, nor may a customer 140 have fewer UDs 150 than are needed to meet their SLA in the event of downtime.

In addition to UDs 150, the CSP may assign VMs 130 across different fault domains (FD) 170 representing distinct (potential) points of failure, which may include physical groupings of host machines 120 susceptible to being taken offline by a single failure. In a simple example, a host machine 120 may be distinct point of failure, and therefore a distinct FD 170 for all the VMs 130 hosted thereon. Alternatively, when a server rack contains multiple host machines 120, the server rack may be a distinct FD 170 for all of the host machines 120 and their associated VMs 130. As part of an SLA, the CSP may distribute instances of VMs 130 across multiple FDs 170 to avoid violating the SLA in the event of a failure to the hardware providing the services (e.g., a power outage, hardware malfunction, etc.). As illustrated, FDs 170A-D comprise groupings of host machines 120 that provide the illustrated instances of VMs 130. As will be understood, FDs 170 may comprise more or fewer host machines 120 than illustrated, and how VMs 130 are assigned to host machines 120 in FDs 170 may differ from the illustrated example.

In various examples the UDs 150 share varying levels of alignment with the FDs 170. When fully aligned, each host machine 120 of a UD 150 is hosted in the same FD 170 and each FD 170 only hosts a single UD 150; there is a 1:1 correlation between the host machines 120 in a given UD 150 and a given FD 170. The illustrated example displays full alignment. Full alignment may be useful, for example, to group host machines 120 providing the instance of VMs 130 when scheduling hardware maintenance. When nonaligned, only a single host machine 120 hosting VMs 130 for a given UD 150 belongs to a given FD 170, and vice versa; only a single host machine 120 of a given FD 170 hosts instances of VMs 130 for a given UD 150, For example, if VM 130E of UD 150D were hosted by host machine 120I of FD 170C instead of host machine 120J of FD 170D, UD 150 would be nonaligned as each of its VMs 130 are hosted by separate FDs 170. Nonalignment may be useful to improve the resiliency of UDs 150 to failures and the resiliency of FDs 170 to upgrades, minimizing the impact that one domain has on the other. Various levels of alignment exist between full alignment and nonalignment, which one of skill in the art after reading the preceding will understand the benefits and tradeoffs to versus full alignment and nonalignment.

Figure 2:
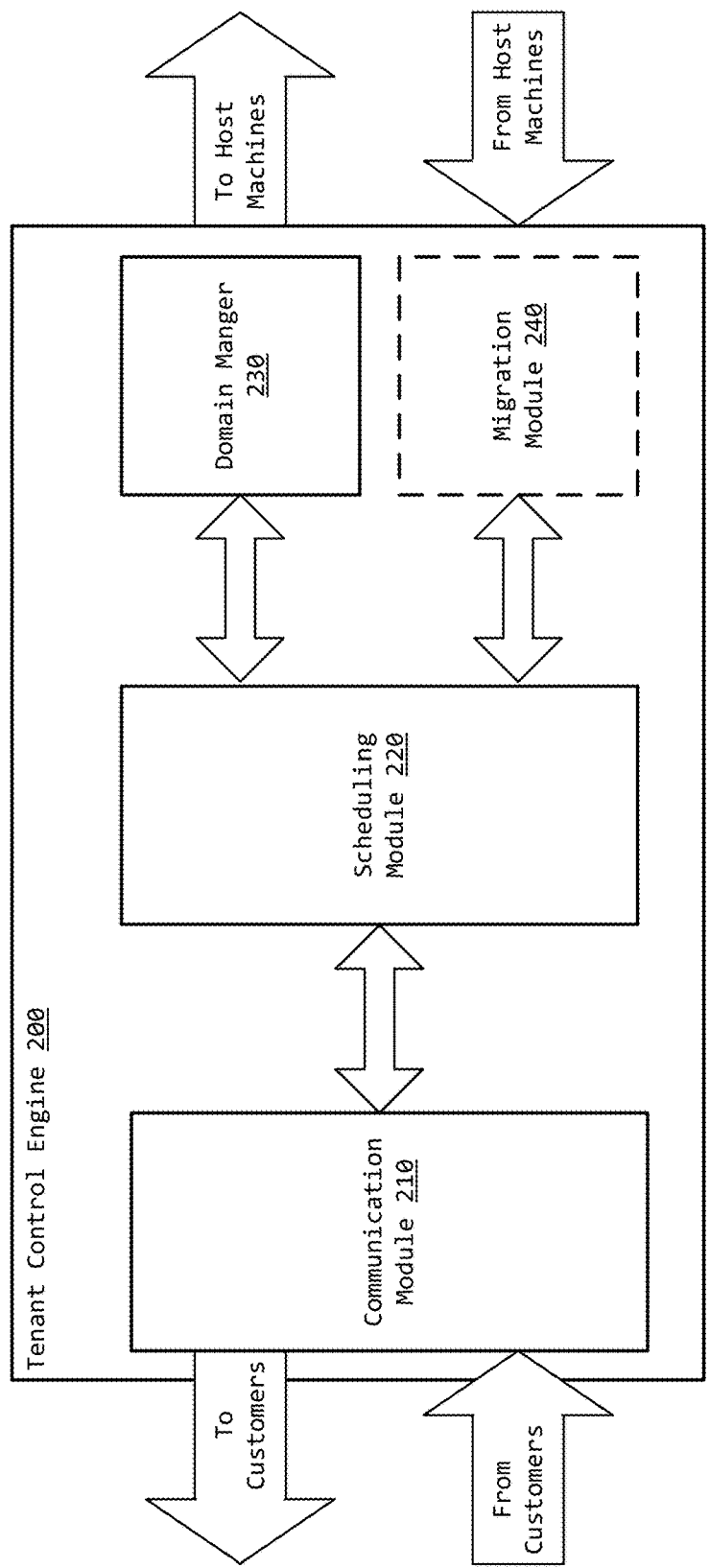
FIG. 2 is a block diagram of a tenant control engine operable to reduce the inconvenience of cloud service downtime for a customer.

FIG. 2 is a block diagram of a tenant control engine 200 operable to reduce the inconvenience of cloud service downtime for a customer 140. According to aspects, the tenant control engine 200 provides tenants control over when downtime will occur within their tenant space 160. Customers 140 may provide the CSP with their preferences for when an update will affect their tenant space 160, which the tenant control engine 200 is operable to interpret to provide the update with less disruption to customers 140 when taking host machines 120 corresponding to a UD 150 offline.

As illustrated, tenant control engine 200 includes a communication module 210, operable to send and receive communications with customers 140, a scheduling module 220, operable to produce a schedule for when host machines 120 (and groups thereof) will be taken offline, a domain manager 230, operable to control when host machines 120 are taken offline, and a migration module 240, operable to migrate instances of VMs 130 to new host machines 120. In various aspects, the migration module 240 may be omitted, disabled, or not used.

The communication module 210 is operable to send and receive communications with customers 140. Customers 140 may be alerted to potential updates or maintenance that will result in downtime for instances of the VMs 130. Such updates and maintenance may include optional updates, which a customer 140 can opt out of (or opt in to), and mandatory updates and maintenance, that a customer cannot opt out of. Such an alert may be communicated to the customer 140 via email, short message service (SMS), telephone, or other service reasonably calculated to apprise a customer 140 to a pending downtime. The communication module 210 may transmit multiple communications to the same customer 140 at substantially the same time using different services. The communication module may also transmit multiple successive alerts or reminders if it has not received a response from a given customer 140.

The communication module 210 may receive the customer's response and interpret it for use in the tenant control engine 200. The response may be received as a tenant-control communication via email, SMS, telephone, a browser client, or other services capable of conveying the customer's preferences regarding an update or maintenance event to which they have been alerted.

In various aspects, the tenant control engine 200 may receive the customer's preferences during an initial setup or deployment of services, which may be used as an initial preference. In other aspects, the tenant control engine 200 may retain the customer's preference from the previous update or maintenance event, which may be reused as a previous preference. Initial and previous preferences may be used in the event that a customer 140 does not timely respond to an alert from the communication module 210. Alternatively, when a customer 140 does not respond to an alert, the tenant control engine 200 may determine that the customer 140 does not have any preference for when an update will affect their tenant space 160.

The communication module 210 is operable to transmit the customer preferences to the scheduling module 220, which is operable to determine how to implement the customer's preferences for when host machines 120 hosting VMs 130 from given UDs 150 or subject to a set of update constraints are taken offline. Customers 140 may set time preferences (in the positive or the negative), a migration preference (e.g., whether to allow migration or to force Update in Place (UIP)), and in varying levels of strength for the preferences.

Time preferences allow customers 140 to select ranges of time to perform an update (i.e., a positive preference) or when not to perform an update (i.e., a negative preference). A positive preference may be likened to a command to "update me now" (a UMN command) to set a given time to be used for updates. Similarly, a negative preference may be likened to a block-off command, where a tenant has blocked a given time from being used for updates. For example, a customer 140 may set positively that it wishes to be updated at a given time, or negatively that is does not wish to be updated at a given time. In some aspects, a UMN command may act as both a positive preference for the tenant sending the UMN command, and as a negative preference for the other tenants sharing the host machine 120; effectively placing a negative preference on any times that are not specified by the UMN command. In some aspects, the UMN command may specify a future time range to run the update, and in other aspects may specify the current time as acceptable to run the update.

A migration preference allows a customer 140 to select whether to retain the same host machine 120 after the update as before the update, that is, whether instances will be migrated to new host machines 120 as part of the update. For example, a customer 140 may state that it may accept moving its VMs 130 to different host machines 120 (i.e., not preferring UIP or allowing migration) or that it will not accept moving its VMS 130 (i.e., preferring UIP or disallowing migration). In various aspects, a customer 140 may specify a fraction or subset of its VMs 130 that it will accept migration for, or may set criteria (e.g., cache below a given size, last accessed within a given time, accessed from a given location, time since last update, etc.) to allow a given VM 130 to be migrated.

In various aspects, strengths (or weights) may be associated with each of the preferences. These strengths may be assigned by the customers 140 in their communications or assigned by the tenant control engine 200. Strengths represent a degree to which the tenant control engine 200 will attempt to satisfy the customer preferences, such that stronger preferences may be satisfied at the expense of weaker preferences. Tenants may be limited in how strong a preference they can express by the tenant control engine 200 and SLAs, such that only some tenants may have preferences of the highest strength or some tenants may be limited to preferences of the lowest strength. Similarly, tenants may be limited in how many strong preferences they can express. In one example, a customer 140 may communicate in its response one strong preference and several weak preferences such that it may express a strong preference to not update on one given day and several weak preference to not update on several other days. Similarly, a customer 140 may weakly prefer a UIP option such that the tenant control engine 200 will not migrate the customer 140 in the event of a conflict unless a conflicting tenant with a stronger preference for UIP shares the same host machine 120, In some aspects, a neutral strength preference may be interpreted the same as no preference, and in other aspects, it may be treated as approval of the given time or migration option for updates (i.e., a lack of a negative preference will be treated as a positive preference of the lowest strength).

In various aspects, time preferences may be related to the expected time to complete the update or a customer-defined range of time. For example, customer preferences may specify thirty-five minute long blocks when an update is expected to last thirty-five minutes. In other aspects, a customer 140 may know what ranges of time during its day, week, or month that would be most convenient or inconvenient for an update to occur, and sets blocks of time accordingly. The scheduling module 220 may be operable to accept ranges of time that begin at regular times (e.g., on the hour, at the half hour, at the quarter hour, etc.) or at irregular times (e.g., seven minutes past the hour, eleven minutes before the hour, etc.). Additionally, the scheduling module 220 may take into account timing constraints from a customer 140 to update each of the host machines 120 providing VMs 130 as quickly as possible (e.g., all host machines 120 or groups thereof are updated back-to-back with no or minimal time gap) or with predefined time periods between updates (e.g., a second host machine 120B cannot be taken offline until an hour after a first host machine 120A is taken offline and brought back online).

In some aspects, the tenant control engine 200 may reserve certain ranges of time during an update that customers 140 cannot set preferences for. For example, a beginning range of time, a repeating range during the update (e.g., from 8:00 am until 9:00 am every day during the update), or an ending range of time during the update may be reserved, for example, to verify the stability of the update, to perform any updates that would otherwise conflict, or to free up resources to enable migration. Similarly, the tenant control engine 200 may limit the number of host machines 120 that may be taken offline at a given time despite those host machines 120 not sharing a tenant. For example, if the tenant control engine 200 reserves only two slots for host machine 120 to update during Saturday night, the first host machine 120A and the second host machine 120B, which do not share tenants, may be taken offline on Saturday night according to their tenants' preferences. However, if a third host machine 120C, with no tenants in common with the first host machine 120A or the second host machine 120B, were to have a tenant wishing to update on Saturday night, the tenant could not set that as a preference, as all available slots have been reserved by the first host machine 120A and the second host machine 120B for Saturday night.

Because multiple customers 140 may share a given host machine 120, the scheduling module 220 may have to balance the preferences of multiple customers 140. The scheduling module 220 may balance the multiple customers 140 in various ways including prioritization and conformance of preferences and migration of instances. These various ways allow the tenant control engine 200 to avoid, resolve, and mitigate conflicts when implementing tenant control in a cloud update.

Prioritization methods place the preferences of some tenants ahead of the preferences of other tenants. In one aspect, the scheduling module 220 only allows one or a limited number of customers 140 per host machine 120 to state their preferences, thus avoiding or minimizing the likelihood of conflict. In another aspect, each customer 140 in a host machine 120 will have its preferences implemented in a cascading fashion, such that a first customer 140A may have its preferences applied before the other customers 140, a second customer 140B will then have its preferences applied in light of the first customer's preferences (e.g., the second customer 140B is prevented from blocking times that the first customer 140A has designated as preferred for updates or preferring times that the first customer 140A has blocked from updates), etc. In yet another aspect, the preferences for an update may be set on a first-come-first-served basis, where any customer 140 can set the preferences affecting its UDs 150 if its preferences are received by the communication module 210 before the preferences of other customers 140.

Conformance methods attempt to form a consensus time range to take a host machine 120 offline from among the tenants so that many, but not all, of the desired preferences can be granted. Conformance methods can be used to satisfy the preferences of a plurality of tenants on a host machine 120 without prioritizing the preferences or the customers 140. In one aspect, customers 140 who are tenants may have their preferences compared against one another to determine the schedule. For example, when sixteen customers 140 are tenants on a given host machine 120, and fifteen have set a preference for a given time slot to update, and the other one has set a preference against, the given time slot will be treated as preferred for updates. When equal numbers of tenants support and oppose a given time, the scheduling module 220 may treat that time slot as neutral when determining how to schedule the update and will attempt to find a time that is preferred more by the tenants. In other aspects, conformance methods may use a decision point other than a majority of tenants on a given host machine 120, for example, if 20% (80%, two tenants, nine tenants, etc.) of the tenants specify a preference for a given range of time to update (or not update) that preference will be implemented.

In some aspects each tenant may be given an equal weight when preferences are compared, and in other aspects, tenants may be given different weights. Tenants may be given weights based on the number of VMs 130 they have running on a host machine 120 or based on their SLA (e.g., a premium SLA versus a basic SLA, a high uptime SLA versus a low uptime SLA, a large SLA versus a small SLA, etc.). In some aspects, a positive preference of full strength or a negative preference of full strength may override preferences of lower strength. For example, a customer 140 that will not accept an update at a given time may set a full strength negative preference to effectively veto any preferences to update at the given time set by other tenants.

When it is determined that a scheduling conflict cannot be resolved to the satisfaction of a customer 140, for example, when that customer 140 has a low priority for its time preferences or in a conformance method its time preferences to do match the consensus time range, a migration preference may be used to meet the customer's preferences; the customer 140 may be migrated or queried if it wishes to migrate to retain an update time in accordance with its time preferences. When a customer 140 is migrated, a new host machine 120 for a given instance of a VM 130 is selected and, at the time of update, the instance will be assigned to that new host machine 120.

When a customer 140 is initially assigned to a host machine 120, that assignment may be based on initial preferences to avoid conflicts with the current tenants, however, customer preferences may change as time progresses. For example, a customer 140 that initially decided that weekends would be preferred times to allow updates may later determine that Monday and Tuesday nights would be better times for updates because it needs full access to its VMs 130 on the weekends. Migration enables customers 140 to be reassigned to host machines 120. In some aspects, a different host machine 120 is located by the migration module 240 that hosts tenants with similar preferences to a migrating customer 140, so that fewer conflicts are expected to arise in future updates. As will be understood, for migration to occur, sufficient resources must be available on a different host machine 120, which may be referred to as "turn space."

Migration, however, is resource intensive for CSPs and may negatively affect the customer 140 being migrated. For example, migration may require a customer to rebuild its instance's cache on a new host machine 120, reduce the distribution of a tenant space 160 across FDs 170, or the priority of a customer 140 against other customers 140 on the new host machine 120, which may cause a customer 140 to prefer a UIP option to a migration option. Alternatively, the customer 140, may prefer a migration option to a UIP option when it provides greater flexibility or less downtime for updates, for example when it takes less time to reboot the VM 130 instance on the new host machine 120 than it takes to update the original host machine 120. A preference for whether a customer 140 will or will not accept migration is therefore used by the scheduling module 220 when determining whether customers 140 should be migrated. Absent a customer preference, the scheduling module 220 is free to determine which customers 140 are migrated, and how they are migrated, based on the technical features of the cloud, the host machines 120, and the size of the VMs 130 to be migrated.

In various aspects, when a customer 140 is migrated, it may be migrated to a host machine 120 that has already been updated so that the migrated instances do not need to be taken offline after the migration. In some aspects, the migration module 240 may determine which updated host machine 120 from a plurality of updated host machines 120 to migrate to based on the preferences of tenants hosted by the updated host machines 120 to match the preferences of the migrating customer 140. In other aspects, a customer 140 may be migrated to an un-updated host machine 120 with other tenants with similar preferences. Migrating to a host machine 120 with tenants with similar preferences may reduce the likelihood that the customer 140 may be migrated in a subsequent update.

When two or more tenants set time preferences that conflict, either of the tenants may be migrated to satisfy their time preferences unless one of the tenants has set a VIP option, in which case the tenants who have not set a UIP option are migrated. As will be appreciated, if two tenants of the same host machine 120 have set a UIP option and have conflicting time preferences, at least one of their preferences must be compromised for the update to be applied. In some aspects, a customer 140 that has set a time preference that conflicts with an existing or higher strength time preference from another tenant may be prompted whether they wish to revise their time preference or migrate to a different host machine 120 that will accommodate the entered time preference. In various aspects, either conflicting customer 140 may be notified of the conflict and queried for alternative preferences, and in other aspects only a customer 140 having a lower priority may be notified and queried for alternative preferences.

The scheduling module 220 is operable to handle conflicts in migration preference in a variety of ways. For example, the UIP option may be made available to only one customer 140 on a given host machine 120. Similarly, each tenant for a given host machine 120 may be given different strengths for their UIP preferences, such that if a conflict exists, a pecking order based on preference strength may be established between tenants. In another aspect, the UIP option (or higher strengths for migration preferences in the pecking order) may be made available on a first-come-first served basis when customers 140 respond to the alert from the communication module 210. The tenant control engine 200 may also allow migration preferences as an alternative to time preferences, allowing a customer 140 to either choose a time for the update or whether to remain in place for the update.

In various aspects, the schedule may be subject to ongoing updates from individual customers 140. These updates may be conducted in phases either by type of preference, by customer 140, or by type of preference and by customer 140. For example, when constructing the schedule by preference phases, customers 140 may be queried for negative timing preferences to block-off times for given updates, the blocked-off schedule may then be transmitted to the customers 140, and customers 140 may communicate their positive preferences, subject to the existing negative preferences, of when to schedule the update. In this way, types of preferences may be given higher strength by the tenant control engine 200 when the schedule is produced. Similarly, when constructing the schedule by customer phases, for example, a first subset of customers 140 having higher priority are queried for their preferences, which are implemented in the schedule, and then a second subset of customers 140 are queried for their preferences in light of the first subset's preferences. In this way, the tenant control engine 200 may give certain customer's preferences higher strengths without overriding the preferences of other customers 140.

When the scheduling module 220 has determined how to implement the update in light of the customer preferences and all conflicts have been resolved, a schedule is produced and communicated to the other modules. The domain manager 230 will implement the schedule, communicating with host machines 120 to take them offline at the times designated in the schedule so that the update may be applied, and the migration module 240 will, if any migrations are needed, find new host machines 120 that instances will be migrated to and perform those migrations at the times specified by the schedule. In some aspects, the scheduling module 220 may communicate the schedule to the communication module 210 for transmission to customers 140. Customers 140, even if their preferences were not implemented (or asked for), may benefit from knowing when downtime will affect portions of their tenant spaces 160 and adjust their activities accordingly.

While the update is being implemented, and host machines 120 are taken offline, the domain manager 230 is operable to ensure no more than one UD 150 for any one customer 140 is offline at a given time. In some aspects, the domain manager 230 is operable to communicate the status of an update to the scheduling module 220 so that if an error occurs or an update for a given UD 150 is done sooner (or later) than expected, the schedule may be adjusted. The status of the update may also be communicated to customers 140, for example, to advise customers 140 that the update has been completed, encountered an error, or reached a percentage of completion.

Figure 3:
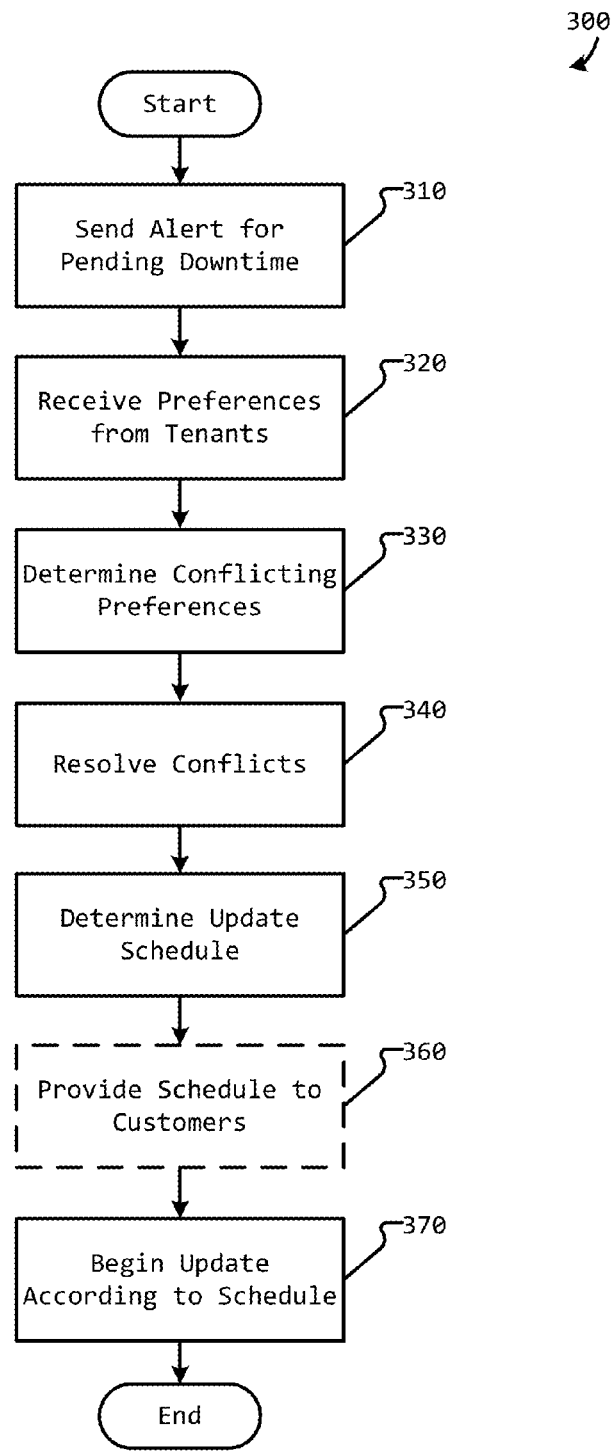
FIG. 3 is a flow chart showing general stages involved in a method for providing tenants control in a cloud update.

FIG. 3 is a flow chart showing general stages involved in a method 300 for providing tenants control in a cloud update. Method 300 starts when an alert for pending downtime is sent to customer 140. The downtime may be due to an update to a HostOS, an operating system for a VM 130, or an application provided to customers 140 that requires that a reboot be applied and the services, or a portion thereof, be made temporarily unavailable. The downtime may also be due to scheduled maintenance of the hardware that will cause the services, or a portion thereof, to be made temporarily unavailable. The alert may be sent to all or a portion of the customers 140, for example, only the portion of customers 140 that will have their preferences queried for may be alerted. In various aspects, the alerts may be sent to the destined customers 140 at one time, or to subsets of destined customers 140 at different times (e.g., in waves), and reminders may be transmitted to customers 140 if a response has not been received after a predetermined time. Alerts may be sent via various formats that customers 140 are capable of receiving, including, but not limited to: email, SMS, telephone, etc.

Customer preferences for when and how the downtime will affect the services provided to tenants are received at OPERATION 320. Preferences may include time preferences, to indicate when a customer 140 believes that downtime should affect its services, and migration preferences, to indicate whether moving to a new host machine 120 is acceptable to the customer 140. In various aspects, preferences may be transmitted from the customers 140 in response to the alert via various formats including, but not limited to: email, web application, SMS, telephone, etc. Example web applications may include various graphical user interfaces, including calendars, that customers 140 can use to select time ranges on to reflect their time preferences. In other aspects, preferences may be retrieved from a database stored by the CSP that may include previously transmitted preferences for customers 140 or an initial preference specified by the SLA or similar agreement. In some aspects, the CSP may use the preferences retrieved from the database without transmitting the alert to those customers 140, while in other aspects the preferences retrieved from the database are used when a customer 140 does not transmit their preferences in a predefined time window.

Preferences from multiple customers, however they are received, may conflict, and these conflicting preferences are determined at OPERATION 330. For example, a first customer 140A may transmit a preference to update in a given time that a second customer 140B, via preferences retrieved from a database, has a preference to block updates in. In this example, the first customer 140A and the second customer 140B would have conflicting preferences if they were tenants of the same host machine 120.

Method 300 proceeds to OPERATION 340, where any conflicting preferences are resolved. In various aspects, conflicts may be resolved using various strategies. In one aspect, preferences may be of varying strengths, set by either the customers 140 or the CSP. In some examples, strengths may establish a priority for preferences to be resolved by, in which preferences of a higher strength trump and override conflicting preferences of a lower strength. In other examples, the preferences for all tenants of a given host machine 120 may be collected to determine an average preference of the tenants, which may or may not include various strengths for each tenant's preferences. In yet other examples, the CSP may resolve conflicts by migrating a conflicting customer 140 to a different host machine 120. Depending on which customers 140 have preferences to UIP and which customers have allowed migration, the CSP will determine which customers 140 with conflicting preferences are to be migrated.

As a part of conflict resolution at OPERATION 340, the CSP may engage in conflict avoidance. For example, the CSP may limit the number of customers 140 that are tenants of a given host machine 120 able to assert their time preferences for downtime during an update, limit the number of customers 140 that are tenants of a given host machine 120 that may have a migration preference, or provide that time preferences and migration preferences are alternatives; a given customer 140 may either assert a time preference or a migration preference, but not both.

Additionally, a CSP may engage in conflict mitigation, where a customer 140 whose preferences are in conflict with another tenant's preferences and cannot be implemented as a result of the conflict is notified of the error in implementing the preferences. The customer 140 may be notified that its preferences have failed to be implemented or notified that its preferences have failed to be implemented and queried for secondary preferences. Secondary preferences may include different time preferences, different migration preferences, or different time and migration preferences. For example, a customer 140 with preferences to update at a given time and UIP, which conflict with another tenant's preferences (e.g., to not update at the given time and UIP), may be notified that its preferences have failed to be implemented, but that the customer 140 may choose whether to change its time preference to preserve its migration preference, change its migration preference to preserve its time preference, or change both its time preferences and migration preferences.

In various aspects, all customers 140 that have conflicting preferences may be notified or be notified and queried for secondary preferences, while in other aspects, only those customers whose preferences are not being implemented are notified or notified and queried. In other aspects, customers 140 may indicate multiple alternative preferences to the CSP, either in response to an alert sent by the CSP or via stored preferences, such that when a primary set of preferences cannot be satisfied, a secondary set of preferences may be substituted. Similarly, if the secondary set of preferences cannot be satisfied due to conflicts, a tertiary or n-ary set of preferences may be substituted until a set of preferences that can be satisfied is identified, a predefined cap of alternatives is reached, or a deadline to receive alternative preferences is reached. When preferences cannot be satisfied, the CSP may determine how to schedule the update based on its own optimization goals or the state of the datacenter 110, regardless of the preferences of the customers 140 or in regard to preferences from a selection of customers 140 (e.g., as many customers 140 as possible, for certain subsets of customers 140, etc.).

After the potential conflicts are resolved at OPERATION 340, method 300 proceeds to OPERATION 350, where the update schedule is determined. In various aspects, the CSP will determine an order in which the host machine 120 are taken offline to perform the update and will estimate how long each host machine 120 will be offline for. The time for how long a host machine 120 will be offline for may include the time necessary to apply the update/maintenance, a time needed to restore services, which may include rebuilding a cache for a given VM 130, and offset time, to provide a margin of error or to have the downtime end at a regular time interval (e.g., on the hour, on the half hour, on a five-minute mark, etc.).

In other aspects, the CSP will determine a host machine 120 to be updated "on the fly" during the update procedure. The CSP will select at host machine 120 that can be taken offline at the present time, without violating any preferences or update constraints for hosted VMs 130, and take it offline to apply the update. The CSP can continue selecting and updating host machines 120 to cycle through the population of host machines 120 until the update is complete. Stated differently, at any time during the "on the fly" update, the set of host machines 120 that can be chosen from to update will depend on which UDs 150 are concurrently having their associated host machines 120 updated, so that multiple UDs 150 from a single tenant space 160 are not taken offline at the same time.

As part of determining the update schedule in OPERATION 350, the CSP will determine whether to migrate any of a customer's VMs 130 and, if applicable, which host machines 120 to migrate those VMs 130 to. When the update schedule is computed before the update, the update schedule will include the time that the migrations will occur at. In various aspects, the CSP may migrate a customer 140 to a host machine 120 that has already been updated, but if no updated host machines 120 are available to migrate the customer 140 to, the customer 140 may be migrated to an un-updated host machine 120. The CSP may determine a different host machine 120 to migrate a customer 140 to based solely on availability of the different host machine 120, availability and the FD 170 of the different host machine 120, availability of the different host machine 120 and preferences of the tenants (pre- and post-update) of the host machine 120, or availability and the FD 170 of the different host machine 120 and preferences of the tenants (pre- and post-update) of the different host machine 120. In some aspects, the CSP may seek to minimize the number of migrations necessary to resolve conflicts.

At OPTIONAL OPERATION 360, the customers 140 may be provided with the schedule determined in OPERATION 350. In various aspects, customers 140 may be provided with the full schedule or only with the times and migration choices that affect the customer 140 and the services it receives. In various aspects, the schedule may be a final schedule that the CSP will use to perform the update, while in other aspects the schedule may be subject to revision and iteration by the customers 140. For example, the customers 140 may receive the schedule and determine a different set of preferences in light of the preferences implemented in the schedule. For example, the preferences of customers 140 may be received in waves, such that a first subset of customers 140 are enabled to set preferences that are binding on subsequent subsets of customers 140, but subject to additional, non-conflicting preferences of those subsequent subsets of customers 140.

In some examples, the customers 140 that are accessing a VM 130 may be provided via the VM 130 with advance warnings according to the schedule that the host machine 120 providing a VM 130 will be taken offline. Advance warnings may be transmitted proximate to when the VM 130 will be taken offline, providing short-term warnings for users to finish the session (e.g., thirty minutes in advance, fifteen minutes in advance, etc.). Multiple advance warnings may be transmitted as reminders to users, for example, to save any work done in the VM 130. The advance warning may include an expected time for taking the host machine 120 offline and an expected time that services will be restored for the VM 130, either by migration or completion of the update/maintenance for the host machine 120, based on the schedule.

At OPERATION 380, the CSP will begin the update according to the schedule, host machines 120 are taken offline, VMs 130 are migrated as necessary, and the host machines 120 are rebooted to apply the update and complete method 300.

Figure 4:
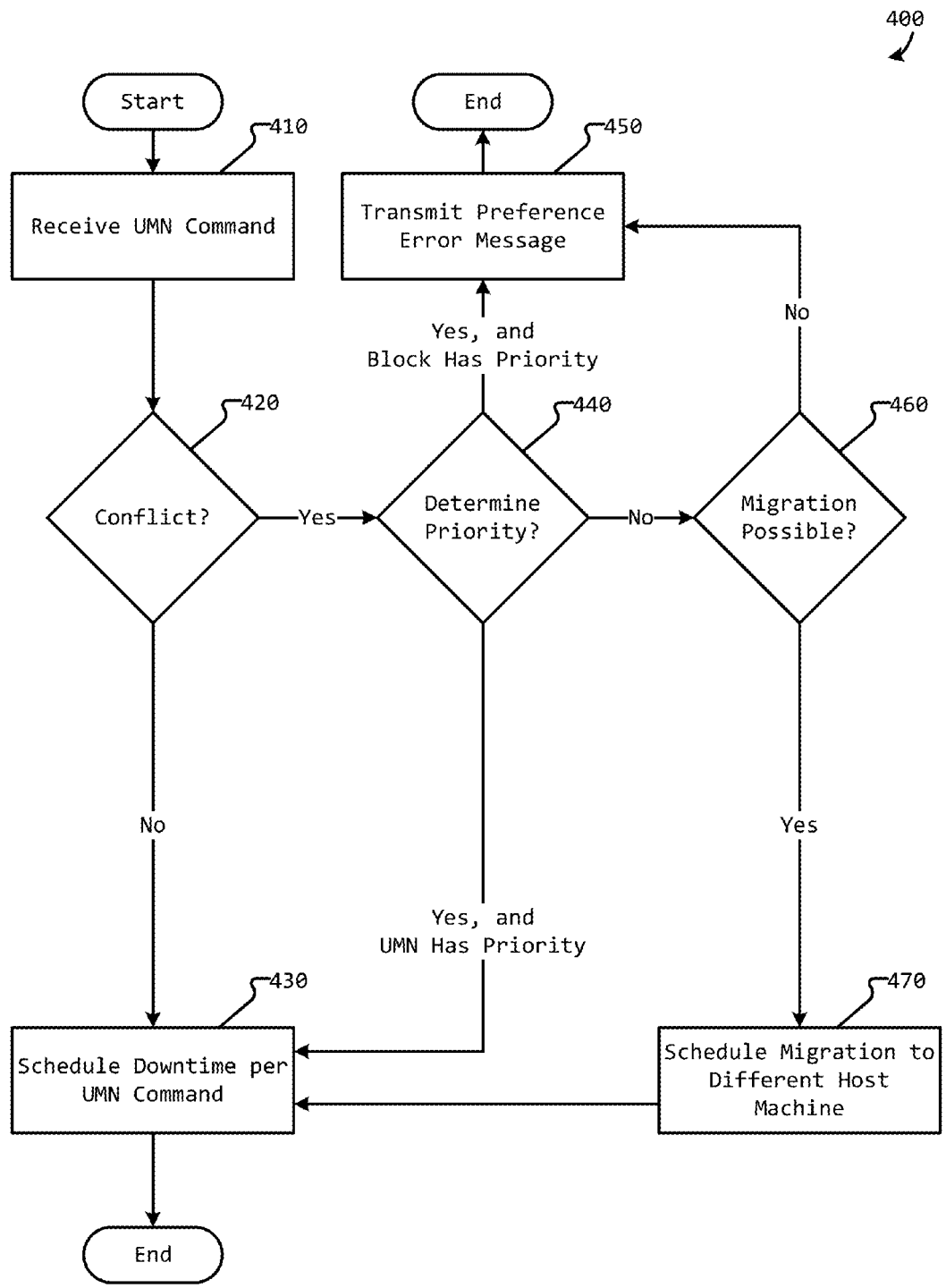
FIG. 4 is a flow chart showing general stages involved in a method for implementing positive time preferences for tenant control of update timing.

FIG. 4 is a flow chart showing general stages involved in a method 400 for implementing positive time preferences for tenant control of update timing. Method 400 starts when a UMN command is received at OPERATION 410. The UMN command may be received via any suitable means (e.g., via a web client, SMS, a telephone tree, etc.) and processed to determine a time that a customer 140 has a preference for accepting downtime for its services in. The UMN command may specify several time ranges (with various associated strengths) for which a tenant may find acceptable for downtime, and may include times that are unacceptable for downtime and migration preferences.

As will be understood, as a customer 140 may be a tenant on multiple host machines 120 that cannot be taken offline simultaneously without violating the SLA or update constraints for the customer 140, the UMN command may be applied for individual host machines 120 or to all host machines 120 providing VMs 130 from a given UD 150 for a given tenant space 160. In various aspects, the CSP may require the total time requested in a UMN command to be sufficient to take all host machines 120 providing VMs 130 for a customer 140 offline and back online. This time may be requested in one continuous range or several discontinuous ranges, but when discontinuous ranges are requested, each individual range's time will equal to or exceed the time needed to take an individual host machine 120 offline and back online to complete the update. The CSP may also limit the number of customers 140 allowed to make UMN commands, for example, not more than one customer 140 per host machine 120, or to a number of customers 140 being provided with 20% of the VMs 130 on a given host machine 120.

As part of a UMN command, times not requested to perform the update in may be blocked off. These blocks specify time ranges that the CSP may not take the host machine 120 that the customer 140 is tenant to offline. When a customer 140 has not specified sufficient time in a UMN command to complete the update for all host machines 120 that the customer 140 is a tenant of, the CSP may block-off a predetermined period of time (e.g., thirty minutes, an hour, etc.) around the range of time specified by the command to perform the update, or may not block-off any time.

At DECISION OPERATION 420 it is determined whether the UMN command conflicts with time preferences from other tenants of a given host machine 120. The conflicting time preferences may overlap all or a portion of the UMN command's specified range of time, however, if it is determined that the update can be completed in a portion of the UMN command's specified range of time that does not conflict with the other tenants' preferences, the UMN command will be treated as non-conflicting. For example, a first customer 140A is a tenant on first host machine 120A and second host machine 120B, and a second customer 140B is a tenant of second host machine 120B and third host machine 120C. For an update expected to last one hour per host machine 120, the first customer 140A may transmit a UMN command for a time range of 8:00 until 10:00, and the second customer 140B may transmit a UMN command for a time range of 7:00 until 9:00, which overlaps a portion of the time preference submitted by the first customer 140A. Because, however, the hour of 8:00 until 9:00 meets both sets of time preferences to update the shared second host machine 120B, and is sufficient to complete an update for a at least a single host machine 120, the UMN commands from the first customer 140A and the second customer 140B will not be treated as conflicting.

When it is determined that there is no conflict, method 400 proceeds to OPERATION 430 to schedule downtime per the UMN command in which to perform the update. Continuing the example above, the downtime to perform the update may be scheduled for the third host machine 120C from 7:00 until 8:00, the second host machine 120B from 8:00 until 9:00, and the first host machine 120A from 9:00 until 10:00, satisfying the preferences of both the first customer 140A and the second customer 140B without conflict. After all updates have been scheduled, method 400 may end.

When it is determined that there is a conflict between the LIMN command and another preference, method 400 proceeds to DECISION OPERATION 440, where priority between conflicting preferences may be determined between the UMN command and any blocks. If a priority is not to be determined, for example in a conformance method or as an alternative to determining priority of preferences on a given host machine 120, method 400 proceeds to DECISION OPERATION 460. Priority may be determined in several ways as discussed above including strengths for priorities assigned by customers 140 and strengths assigned by the CSP based on customer 140 SLA, time of receiving the preference (e.g., preferences received earlier are given higher strengths than preferences received later or retrieved from a database), type of time preference (e.g., positive or negative), size of preference's time range (e.g., smaller ranges are given higher strength than larger ranges), etc.

When it is determined at DECISION OPERATION 440 that the UMN command's preferences do not have priority, method 400 proceeds to OPERATION 450, where a preference error message is transmitted to the customer 140 that the UMN command was received from. In various examples, a preference error message notifies a customer 140 that its preferences cannot be implemented due to conflicts. In some aspects, the customer 140 may be queried to provide secondary or alternative preferences in light on the conflicting preferences, and in other aspects, the customer 140 may simply be notified. The preference error message may be transmitted via email, SMS, telephone or other method reasonably apprised to provide the affected customer 140 with notice that its preferences as submitted will not be implemented. After transmission at OPERATION 450, method 400 may end.

When it is determined at DECISION OPERATION 440 that the UMN command's preferences have priority, method 400 proceeds to OPERATION 430, where downtime is scheduled per the UMN command. The customers 140 that are associated with any preferences that are overridden by the UMN command may be notified that their preferences are no longer in effect, similarly to how the customer 140 who submitted the UMN command may be notified in OPERATION 450 if its preferences are not to be implemented.

If the UMN command conflicts with another preference, but priority is not determined for either the UMN command or the conflicting preference, or the priority cannot be established, method 400 will proceed to DECISION OPERATION 460 to determine whether migration is possible. The determination may include an analysis of the different host machines 120 to determine if sufficient turn space is available to accept the customer's VMs 130 from the originating host machine 120. The determination may also include an analysis of a migration preference for the customer 140 that submitted the UMN command. In various examples, these determinations may be made concurrently with the priority determinations in DECISION OPERATION 440 or be made before the determinations in DECISION OPERATION 440.

When it is determined that a migration is not possible, method 400 will proceed to OPERATION 450 where a preference error message is transmitted to the customer 140 from which the UMN command was received. Method 400 may then end.

When it is determined that migration is possible, method 400 proceeds to OPERATION 470, where migration to a different host machine 120 is scheduled. The different host machine 120 may be chosen for the scheduled migration based on whether it will have been updated by the time the migration occurs, the preferences of the other tenants (pre- and post-update) on the different host machine 120, and the FDs 170 of the different host machine 120. In various aspects, the particular host machine 120 to which the VMs 130 will be migrated may be selected based on its FD 170. The host machine 120 may also be selected based on its free resources so that the CSP can evenly balance to workload of the host machines 120 or to maximize the utilization of memory space or processing power of a given host machine 120.

Once a migration has been scheduled in OPERATION 470, method 400 proceeds to operation 430, where the scheduled migration is made part of the scheduled downtime and the time range specified by the UMN command is scheduled for the update of the different host machine 120. Method 400 may then end.

Figure 5:
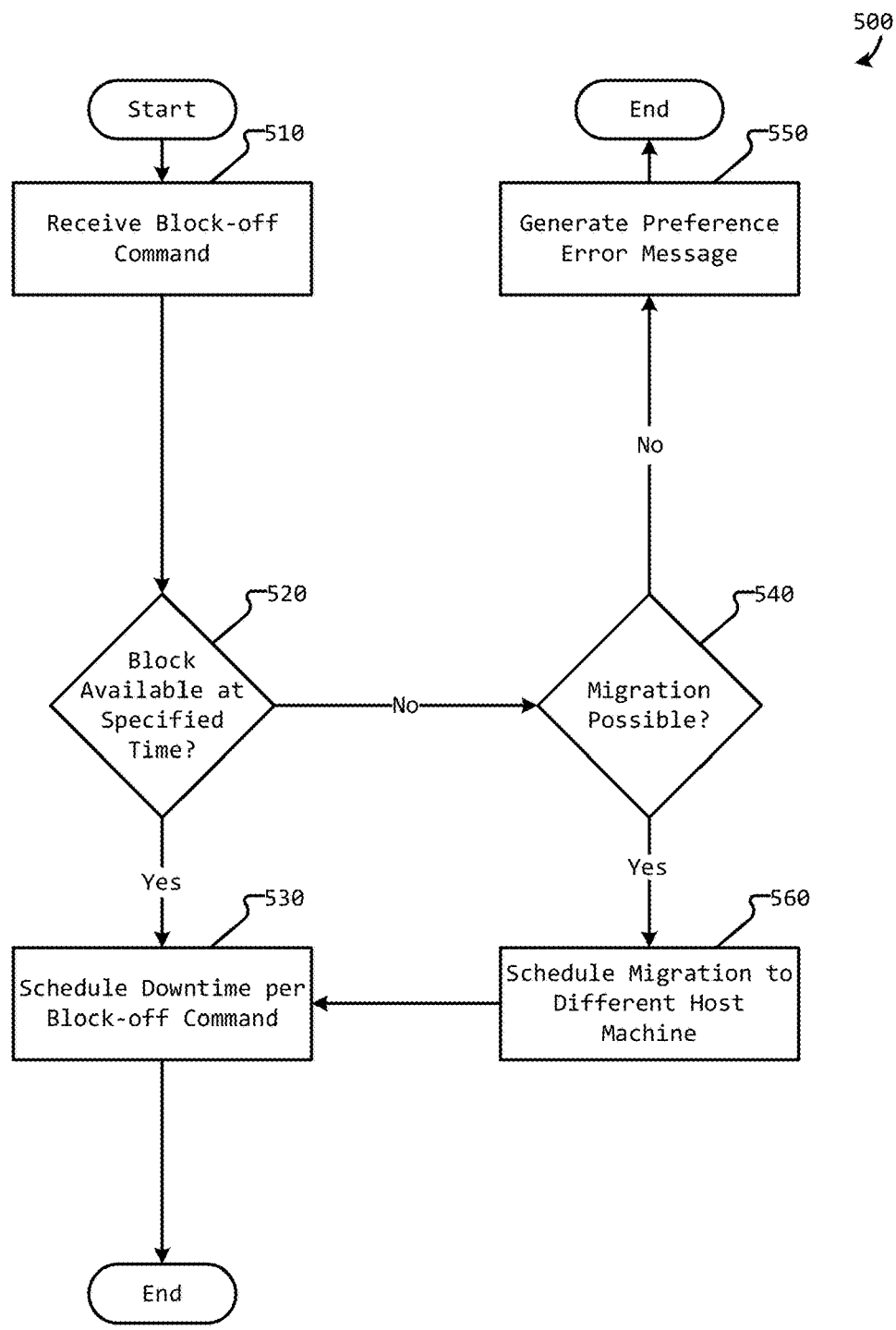
FIG. 5 is a flow chart showing general stages involved in a method for implementing negative time preferences for tenant control of update timing.

FIG. 5 is a flow chart showing general stages involved in a method 500 for implementing negative time preferences for tenant control of update timing. Method 500 starts when a block-off command is received at OPERATION 510. The block-off command may be received via any suitable means (e.g., via a web client, SMS, a telephone tree, etc.) and processed to determine a time that a customer 140 has a preference for disallowing downtime for their services in. The block-off command may specify several time ranges (with various associated strengths) for which a tenant may find unacceptable for downtime, and may include times that are acceptable for downtime and migration preferences.

Method 500 proceeds to DECISION OPERATION 520, where it is determined whether the time range specified in the block-off command is available. In various aspects, the time range may not be available due to a conflicting LIMN command to update at the given time, or due to the CSP reserving the time so that it cannot be blocked by a customer 140. In various examples, the block command may be of a higher priority than the conflicting preference and therefore the time range will be available despite the conflict. Conflicting preferences may include positive preferences to update in the given time range or negative preferences that cause the time range specified by the block-off command to exceed a limit imposed by the CSP on time slots available to be blocked off.

As will be understood, the CSP requires a certain amount of time to perform an update in. A CSP may therefore limit the amount of time that any one customer 140 or all customers 140 may block-off during an update, or may reserve some time ranges as un-blockable from updates. The amount of time that customers 140 are able to block-off may also be affected by the number of UDs 150 that the customer 140 is assigned to. Although a CSP may roll out an update gradually across host machines 120, multiple host machines 120 may be taken offline during the same time by the CSP so long as the host machines 120 do not provide VMs 130 from different UDs 150 from the same tenant space 160. As a the CSP seeks to take more host machines 120 offline simultaneously, the greater the likelihood that multiple UDs 150 from the same tenant space 160 will be involved, especially as customers 140 spread their VMs 130 into a greater number of UDs 150. The CSP may therefore allot a customer 140 time ranges to block-off based on the number of VMs 130 or UDs 150 that it has. For example, a customer 140 that has more UDs 150 (which limit the CSPs ability to schedule multiple host machines 120 for simultaneous downtime) may be allotted fewer time ranges to block-off than a customer 140 that has fewer UDs 150. Alternatively, the CSP may allot more time ranges to block-off to a customer 140 with more UDS 150 or VMs 130 by virtue of the size of that customer's 140 tenant space 160 or a premium that the customer 140 may pay. In other examples, the number of customers 140 whose preferences are considered by the CSP may be limited across a data center 110 or host machine 120, for example, not more than 50% of customers 140 of a data center 110 may set negative time preferences. In yet other examples, the CSP limits the number of customers 140 whose preferences are considered and the amount of time that they are able to block-off in a given time period, for example, not more than 50% of customers 140 may set negative time preferences, and those customers 140 may not specify more than 50% of a day as blocked.

When it is determined that the time range specified in the block-off command is available, method 500 will proceed to OPERATION 530, where the schedule for the update including downtime for each UD 150 will incorporate the block-off command so that the host machines 120 providing VMs 130 to the customer 140 that sends the block-off command are not updated during the specified time range. Method 500 may then end.

When it is determined that the time range specified in the block-off command is not available, method 500 will proceed to DECISION OPERATION 540, where it is determined whether migration is possible. Migration may be possible if either the customer 140 submitting the block-off command or the customer 140 who submitted the preference that conflicts with the time range specified in the block-off command have not set a migration preference to UIP; either tenant may be scheduled for migration so that the block-off command can be implemented as submitted. Accordingly, the CSP may limit the number of customers 140 who may set both a time preference and have a preference for UIP.

For migration to be determined to be possible at DECISION OPERATION 540 while implementing the block-off command, a destination host machine 120 must also not have a conflict for the time range specified by the block-off command and must have sufficient resources available to host the VM 130 instances of the customer 140 being migrated. In various examples, the CSP may determine that migration is possible via cascading migrations. For example, if a first customer 140A is a tenant on first host machine 120A and submits a block-off command that conflicts with tenants of the first host machine 120A who do not allow migration, the CSP may migrate the first customer 140A to a second host machine 120B. However, if the second host machine 120B does not have enough computing resources to handle the first customer 140A, or a second customer 140B that is a tenant of the second host machine 120B has preferences that would conflict with preferences specified by the first customer 140A in the block-off command, it may be determined that migration to second host machine 120B is not possible. If the CSP allowed cascading migration, however, migration of the first customer 140A to the second host machine 120B would be possible if the second customer 140B could be migrated to a third host machine 120C (or the first host machine 120A) to either increase the computing resources available or remove a conflicting preference from the second host machine 120B. As will be understood, the CSP would prefer to move the first customer 140A to the third host machine 120C to reduce the number of migrations necessary, but may use cascading migrations if the first customer 140A can move into the second host machine 120B, but not the third host machine 120C. In various aspects, the CSP may limit the number of cascades possible in cascading migrations when determining whether migration is possible.

When it is determined that migration is not possible, method 500 proceeds to OPERATION 550, where a preference error message is transmitted to the customer 140 that the block-off command was received from. In various examples, a preference error message notifies a customer 140 that its preferences cannot be implemented due to conflicts. In some aspects, the customer 140 may be queried to provide secondary or alternative preferences in light on the conflicting preferences, and in other aspects, the customer 140 may simply be notified. The preference error message may be transmitted via email, SMS, telephone or other method reasonably apprised to provide the affected customer 140 with notice that its preferences as submitted will not be implemented. After transmission at OPERATION 550, method 500 may end.

When it is determined that migration is possible, method 500 proceeds to OPERATION 560, where migration to a different host machine 120 is scheduled. The different host machine 120 may be chosen for the scheduled migration based on whether it will have been updated by the time the migration occurs, the preferences of the other tenants (pre- and post-update) on the different host machine 120, and the FDs 170 of the different host machine 120. In various aspects, the particular host machine 120 to which the VMs 130 will be migrated may be selected based on its FD 170. The host machine 120 may also be selected based on its free resources so that the CSP can evenly balance to workload of the host machines 120 or to maximize the utilization of memory space or processing power of a given host machine 120.

Once a migration has been scheduled in OPERATION 560, method 500 proceeds to operation 530, where the scheduled migration is made part of the scheduled downtime and the time range to block specified by the block-off command is blocked off from updating for the different host machine 120. Method 500 may then end.

While the present disclosure has been described in the general context of program modules that execute in conjunction with an application program that runs on an operating system on a computer, those skilled in the art will recognize that the present disclosure may also be implemented in combination with other program modules. Generally, program modules include routines, programs, components, data structures, and other types of structures that perform particular tasks or implement particular abstract data types.

Figure 6:
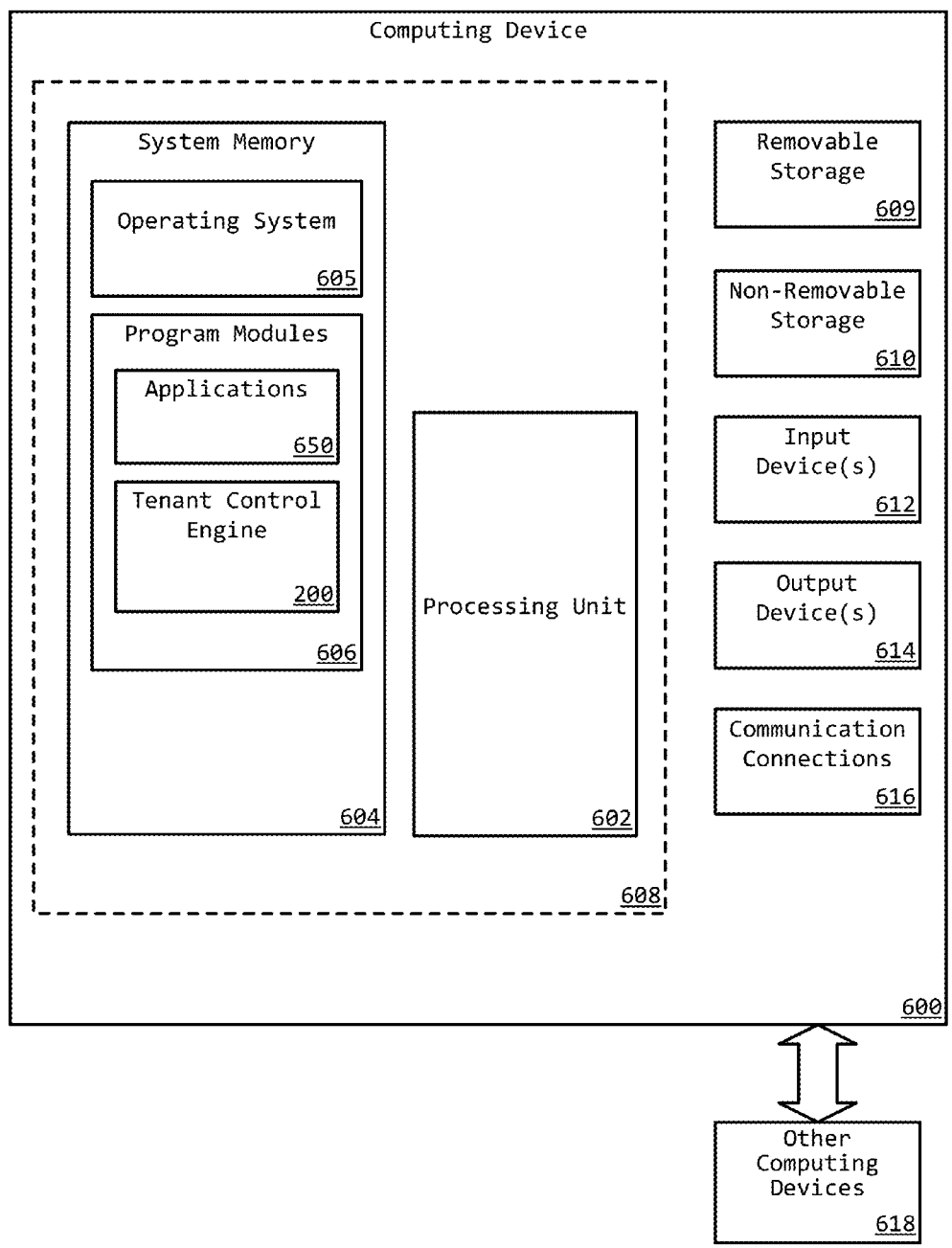
FIG. 6 is a block diagram illustrating physical components of a computing device with which aspects and examples may be practiced.

FIG. 6 and the associated descriptions provide a discussion of a variety of operating environments in which examples of the present disclosure may be practiced. However, the devices and systems illustrated and discussed with respect to FIG. 6 are for purposes of example and illustration and are not limiting of a vast number of computing device configurations that may be utilized for practicing aspects described herein.

FIG. 6 is a block diagram illustrating physical components (i.e., hardware) of a computing device 600 with which examples may be practiced. The computing device components described below may be suitable for the host machines 120 or a device providing the tenant control engine 200 described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650. According to an aspect, the system memory 604 may include the tenant control engine 200. The operating system 605, for example, may be suitable for controlling the operation of the computing device 600. Furthermore, aspects may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., tenant control engine 200) may perform processes including, but not limited to, one or more of the stages of the methods 300, 400, and 500 illustrated in FIGS. 3, 4, and 5 respectively. Other program modules that may be used in accordance with examples of the present disclosure and may include applications such as electronic mail and contacts applications, word processing applications, spreadsheet applications, database applications, slide presentation applications, drawing or computer-aided application programs, etc.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, or transceiver circuitry; universal serial bus (USB), parallel, or serial ports.

The term computer readable media as used herein includes computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. The term "computer storage media" does not include carrier waves, propagated data signals or other transmission media.

Transmission media may embody computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, transmission media may include wired media such as a wired network or direct-wired connection, and wireless media such as acoustic, radio frequency (RF), infrared, and other wireless media.

Aspects of the present disclosure, for example, are described above with reference to block diagrams or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure in any way. The aspects, examples, and details provided in this application are considered sufficient to convey possession and enable others to make and use the best mode of tenant-controlled cloud updates. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from its broader scope.

We claim:

1. A system for providing tenant-control in a cloud update, comprising:
    one or more host machines operating within a cloud computing service, each host machine hosting one or more virtual machines, wherein customers of the cloud computing service are tenants of the one or more host machines;
    a processing unit; and
    a memory including instructions, which when executed by the processing unit provide:
        a tenant control engine including:
            a communication module, operable to receive preferences from customers for scheduling a cloud update of one or more of the host machines;
            a scheduling module, operable to create a schedule for the cloud update using the received preferences without violating an update constraint that restricts a first host machine from being offline while a second host machine is offline when a tenant has instances of virtual machines hosted by both the first host machine and the second host machine;
            a domain manager, operable to control when the host machines are taken offline to perform the cloud update per the created schedule; and
            a migration module, operable to migrate an instance of a virtual machine hosted by a given host machine to a different host machine to resolve conflicts between the received preferences of a first customer and a second customer on the given host machine.

2. The system of claim 1, wherein a given customer's preference specifies a time range that the given customer prefers for the cloud update to be performed.

3. The system of claim 1, wherein a given customer's preference specifies a time range that the given customer prefers for the cloud update to not be performed.

4. The system of claim 1, wherein the preferences specify that a given customer will accept migration to the different host machine or will not accept migration to the different host machine.

5. The system of claim 1, wherein a given customer is enabled to provide control via the preferences for a time range or a refusal of migration as mutually exclusive alternatives.

6. The system of claim 1, wherein if a given customer specifies a migration preference to update in place, no other customers that are tenants of the same host machines of the given customer are able to specify a migration preference to update in place.

7. The system of claim 1, wherein the tenant control engine reserves time slots in which the customers cannot specify preferences for time ranges to perform the update.

8. The system of claim 1, wherein if the migration module cannot resolve the conflicts by migrating the first customer or the second customer, the first customer and the second customer are notified of the conflicts and queried for secondary preferences by the communication module.

9. A method for providing tenant-control in a cloud update, comprising:
    receiving preferences from a plurality of customers for a cloud update for a data center, wherein the data center includes a plurality of host machines, each providing one or more instances of virtual machines to the plurality of customers, wherein a given host machine of the plurality of host machines is subject to update constraints;
    checking for conflicts among the received preferences from the plurality of customers, wherein the conflicts include a first customer specifying a negative time preference for a reserved time period;

resolving any conflicts by
receiving a secondary preference from at least one customer to substitute for the received preference of the at least one customer;

creating a schedule based on the time preferences that specifies an order and a time range that each host machine in the data center will be taken offline when the cloud update is performed, wherein the time range specified for a first update command sharing at least one customer in common with a second update command does not overlap with the time range specified for the second update command; and performing the cloud update per the schedule.

10. The method of claim 9, wherein the schedule is transmitted to the plurality of customers prior to performing the cloud update per the schedule.

11. The method of claim 9, wherein the conflicts further comprise a first customer specifying a positive time preference for a given range of time and a second customer specifying a negative time preference for the given range of time.

12. The method of claim 9, further resolving any conflicts by at least one of:
migrating at least one customer to a different host machine; and
setting the time preference for at least one customer to the reserved time period.

13. The method of claim 12, wherein all updates are performed in place, wherein no customers of the plurality of customers are migrated to resolve any conflicts.

14. The method of claim 12, further comprising:
receiving migration preferences from the plurality of customers, wherein the migration preferences specify whether a given customer will accept migrating to the different host machine to resolve any conflicts, wherein the given customer specifying that it does not accept migrating to the different host machine to resolve any conflicts will not be migrated to resolve any conflicts.

15. The method of claim 12, wherein migrating at least one customer to a different host machine further comprises:
selecting the different host machine based on the different host machine's customers' preferences, such that the at least one customer's time preference does not conflict with the different host machine's customers' time preferences.

* * * * *

UNITED STATES PATENT AND TRADEMARK OFFICE
CERTIFICATE OF CORRECTION

PATENT NO. : 10,459,750 B2  
APPLICATION NO. : 15/578967  
DATED : October 29, 2019  
INVENTOR(S) : Jiaxing Zhang Page 1 of 1

It is certified that error appears in the above-identified patent and that said Letters Patent is hereby corrected as shown below:

On the Title Page

(72) Inventors: The seventh inventor's name is incorrect. "James E. Johnson, Jr." should read --James E. Johnson--

Signed and Sealed this  
Thirteenth Day of October, 2020

Andrei Iancu  
*Director of the United States Patent and Trademark Office*